United States Patent
Harada et al.

[19]

[11] Patent Number: 6,081,761
[45] Date of Patent: Jun. 27, 2000

[54] AUTOMATIC DECELERATION CONTROL METHOD AND APPARATUS FOR A VEHICLE

[75] Inventors: Masaharu Harada, Kawasaki; Katsushi Matsuda; Kunio Sakata, both of Yokohama, all of Japan

[73] Assignee: Mitsubishi Jidosha Kogyo Kabushiki Kaisha, Tokyo, Japan

[21] Appl. No.: 09/054,475

[22] Filed: Jan. 3, 1998

[30] Foreign Application Priority Data

Apr. 4, 1997 [JP] Japan .................................. 9-087053

[51] Int. Cl.$^7$ ............................ F02D 29/02; F02D 45/00; B60T 8/00; B60T 8/32
[52] U.S. Cl. ........................ 701/72; 73/117.3; 701/79; 701/80; 701/90
[58] Field of Search .................. 73/117.2, 117.3, 73/116, 118.1; 701/70, 71, 72, 73, 76, 78, 79, 80, 82, 83, 84, 90, 91, 92, 93

[56] References Cited

U.S. PATENT DOCUMENTS

| | | | |
|---|---|---|---|
| 4,680,714 | 7/1987 | Kubo | 701/70 |
| 5,047,940 | 9/1991 | Onaka et al. | 701/82 |
| 5,702,165 | 12/1997 | Koibuchi | 701/71 |
| 5,738,420 | 4/1998 | Kawaguchi et al. | 701/83 |
| 5,902,345 | 5/1999 | Minowa et al. | 701/96 |

FOREIGN PATENT DOCUMENTS

4232349  8/1992  Japan .

*Primary Examiner*—George Dombroske

[57] ABSTRACT

An automatic deceleration control apparatus for a vehicle operates so as to secure appropriate tire grip performance, depending on the conditions of a road surface on which the vehicle runs turning, and restrain excessive rolling of the vehicle body, thereby stabilizing the turning behavior of the vehicle at all times. While the vehicle is turning on a high-friction road surface without undergoing yaw moment control, a safe vehicle speed is computed within the rollover limit of the vehicle. While the vehicle is turning on a low-friction road surface under yaw moment control, on the other hand, a safe vehicle speed that ensures satisfactory tire grip performance is computed in accordance with an estimated road friction coefficient. When the vehicle is about to exceed its safe speed as it turns, it is automatically decelerated to the safe speed or below. Thus, the vehicle can be prevented from spinning, drifting out, or rolling over.

26 Claims, 7 Drawing Sheets

AUTOMATIC DECELERATION CONTROL METHOD AND APPARATUS FOR A VEHICLE

BACKGROUND OF THE INVENTION

1. Field of the Invention

The present invention relates to an automatic deceleration control method and apparatus for automatically decelerating a turning vehicle, thereby stabilizing the turning behavior of the vehicle.

2. Description of Related Art

In relation to stabilization of the turning behavior of a vehicle, Japanese Provisional Patent Publication No. 4-232349 discloses an output control apparatus for controlling engine output torque depending on road surface conditions. This apparatus sets the stability factor of the vehicle in accordance with an estimated road friction coefficient while the vehicle is turning. Based on the stability factor and detected vehicle speed and front-wheel steering angle, the apparatus computes an allowable lateral acceleration, and controls the output torque of the vehicle such that the allowable lateral acceleration is not exceeded. According to this output control apparatus, the output torque of the turning vehicle can be restricted depending on the road surface conditions, so as to prevent the vehicle from drifting out or spinning.

The allowable lateral acceleration computed by the conventional output control apparatus described above naturally takes a large value when the vehicle runs on a road surface with a relatively high friction coefficient. In the case of a passenger car which has a relatively low center of gravity, even if the allowable lateral acceleration takes a large value, the car body can be restrained from rolling by restricting an actual lateral acceleration applied to the body to the allowable lateral acceleration or below. However, a large-sized vehicle having a high center of gravity may fail to enjoy a stable turning behavior when undesired excessive rolling of the vehicle body occurs. Since the allowable lateral acceleration can be large in magnitude, such excessive rolling can occur, even if the actual lateral acceleration is restricted to the allowable lateral acceleration.

SUMMARY OF THE INVENTION

The object of the present invention is to provide an automatic deceleration control method and apparatus for a vehicle, in which the body of a turning vehicle can be restrained from excessively rolling so that the turning behavior of the vehicle can be stabilized, and which are suitable to large-sized vehicles such as trucks and buses.

According to one aspect of the present invention, there is provided an automatic deceleration control method for automatically decelerating a vehicle in accordance with a turning state of the vehicle, thereby stabilizing the turning behavior of the vehicle. This method comprises the steps of: (a) detecting the turning state of the vehicle; (b) detecting the friction coefficient of a road surface on which the vehicle is running; (c) setting a safe vehicle speed in accordance with the turning state detected in said step (a) and the road friction coefficient detected in said step (b) such that the safe vehicle speed is set at a value which increases with increase in the road friction coefficient, when the road friction coefficient falling within a medium or low region is detected in said step (b); (d) setting the safe vehicle speed in accordance with the turning state detected in said step (a) and the road friction coefficient detected in step (b) while restraining increase of the safe vehicle speed when the road friction coefficient falling within a high region is detected in said step (b); and (e) automatically decelerating the vehicle so as to cause the actual vehicle speed to be equal to or less than the safe vehicle speed set in said step (c) or (d) when a turning motion of the vehicle is detected in said step (a).

According to the automatic deceleration control method of the invention described above, the safe vehicle speed for the turning vehicle is optimally set in accordance with the turning state of the vehicle. When the actual vehicle speed is about to exceed the safe vehicle speed, the vehicle is automatically decelerated to the level of the safe vehicle speed or below, so that the vehicle can be prevented from spinning or drifting out. In the case where the vehicle turns on a road surface with a relatively low friction coefficient, the safe vehicle speed is set at a value which increases with the increase in the road friction coefficient. That is, the higher the road friction coefficient, the higher the value at which the safe vehicle speed is set is. Accordingly, the vehicle can fulfill its turning performance without being decelerated excessively. While the vehicle is turning on a high-friction road, the safe vehicle speed can be restrained from increasing (or being set at a higher value with the increase in the road friction coefficient). Thus, the vehicle body can be effectively prevented from excessively rolling, so that the possibility of the vehicle's rolling over can be eliminated effectively. In the end, according to the automatic deceleration control method of the invention, the vehicle can enjoy both high turning performance and security for stabilized turning behavior.

In the present invention, preferably, the step (d) includes setting the safe vehicle speed at a fixed value corresponding to the maximum value of the safe vehicle speed set in said step (c) under the same turning state. Alternatively, the step (d) includes setting the safe vehicle speed at a value which slightly increases, from the aforesaid fixed value, with increase in the road friction coefficient.

According to this preferred control method, the vehicle can be prevented from excessively rolling as well as from being excessively decelerated while it is running on a high-friction road.

Preferably, the step (c) includes setting the safe vehicle speed at a value not higher than the tire grip limit of the vehicle. The step (d) includes setting the safe vehicle speed at a value not higher than the rollover limit of the vehicle.

With this preferred control method, the vehicle can turn on a medium- or low-friction road with satisfactory tire grip performance without spinning or drifting out. Further, the vehicle can be securely prevented from rolling over on a high-friction road.

Preferably, the step (a) includes detecting an actual vehicle speed and an actual lateral acceleration. The step (c) includes setting the safe vehicle speed in accordance with the road friction coefficient detected in said step (b) and a turning radius, calculated according to the actual vehicle speed and the actual lateral acceleration detected in said step (a). The step (d) includes setting the safe vehicle speed in accordance with the actual vehicle speed and the actual lateral acceleration detected in said step (a) and a preset rollover-limit lateral acceleration.

According to this preferred control method, the safe vehicle speed can be set appropriately in accordance with the road friction coefficient.

Preferably, the step (b) includes concluding that the road friction coefficient is in the medium or low region when yaw moment control for operating a brake system so as to produce a braking power difference between wheels of the vehicle to thereby generate a yaw moment on the vehicle is carried out, and concluding that the road friction coefficient is in the high region when the yaw moment control is not carried out.

According to this preferred control method, the automatic deceleration control is carried out in concert with the yaw moment control so that the turning behavior of the vehicle can be stabilized, and the region for the road friction coefficient, medium or low or high, can be detected with ease.

Alternatively, the step (b) includes concluding that the road friction coefficient is in the medium or low region when the detected road friction coefficient is lower than a preset threshold value, and concluding that the road friction coefficient is in the high region when the detected road friction coefficient is higher than the threshold value.

According to this preferred control method, the region for the road friction coefficient, medium or low or high, can be detected properly.

An automatic deceleration control method according to another aspect of the present invention comprises the steps of: (a) detecting a turning state of the vehicle; (b) detecting an actual lateral acceleration generated in a vehicle; (c) detecting the friction coefficient of a road surface on which the vehicle is running; (d) setting an allowable lateral acceleration at a value which increases with increase in the road friction coefficient when the road friction coefficient falling within a medium or low region is detected in said step (c); (e) setting an allowable lateral acceleration while restraining increase of the allowable lateral acceleration when the road friction coefficient falling within a high region is detected in said step (c); and (f) automatically decelerating the vehicle so as to cause the actual lateral acceleration detected in said step (b) to be equal or less than the allowable lateral acceleration set in said step (d) or (e) when a turning motion of the vehicle is detected in said step (a).

According to this automatic deceleration control method, the turning vehicle is automatically decelerated to be prevented from spinning or drifting out when the actual lateral acceleration generated therein is about to exceed the allowable lateral acceleration. In the case where the vehicle turns on a road surface with a relatively low friction coefficient, the allowable lateral acceleration is set at a value which increases with the increase in the road friction coefficient. That is, the higher the road friction coefficient, the higher the value at which the allowable lateral acceleration is set is. Accordingly, the vehicle can fulfill its turning performance without being decelerated excessively. While the vehicle is turning on a high-friction road, the allowable lateral acceleration can be restrained from increasing (or being set at a higher value with the increase in the road friction coefficient). Thus, the vehicle body can be effectively prevented from excessively rolling, so that the possibility of the vehicle's rolling over can be eliminated effectively.

The above-described method includes various preferred embodiment which are similar in construction and advantage to those of the method according to the first aspect of this invention. This is applied to the below-mentioned apparatuses.

According to still another aspect of the invention, there is provided an automatic deceleration control apparatus for automatically decelerating a vehicle in accordance with a turning state of the vehicle, thereby stabilizing the turning behavior of the vehicle. This apparatus comprises: a turning state detecting section for detecting the turning state of the vehicle; a friction coefficient detecting section for detecting the friction coefficient of a road surface; a deceleration control section operable independently of a driver's braking operation and adapted to automatically decelerate the vehicle so as to cause an actual vehicle speed to be equal or less than a safe vehicle speed when a turning motion of the vehicle is detected by the turning state detecting section; and a setting section for setting the safe vehicle speed in accordance with the turning state detected by the turning state detecting section. The setting section sets the safe vehicle speed at a value which increases with increase in the road friction coefficient when the road friction coefficient falling within a medium or low region is detected by the friction coefficient detecting section. Further, the setting section restrains increase of the safe vehicle speed when the road friction coefficient falling within a high region is detected by the friction coefficient detecting section.

In the case where the vehicle turns on a road surface with a relatively low friction coefficient, according to the automatic deceleration control apparatus of the invention described above, the higher the road friction coefficient, the higher the value at which the safe vehicle speed is set is. Accordingly, the vehicle can fulfill its turning performance without being decelerated excessively. While the vehicle is turning on a high-friction road, the safe vehicle speed can be restrained from increasing, so that the vehicle body can be prevented from excessively rolling.

Preferably, the turning state detecting section includes a vehicle speed sensor for detecting an actual vehicle speed and a lateral acceleration sensor for detecting an actual lateral acceleration. The automatic deceleration control apparatus further comprises a turning radius estimating section for estimating a turning radius from the actual vehicle speed detected by the vehicle speed sensor and the actual lateral acceleration detected by the lateral acceleration sensor. The setting section includes a first setting section for setting the safe vehicle speed in accordance with the road friction coefficient detected by the friction coefficient detecting section and the turning radius estimated by the turning radius estimating section, a second setting section for setting the safe vehicle speed in accordance with a preset rollover-limit lateral acceleration, the actual vehicle speed detected by the vehicle speed sensor, and the actual lateral acceleration detected by the lateral acceleration sensor, and a safe vehicle speed selecting section adapted to select the safe vehicle speed set by the first setting section when the road friction coefficient detected by the friction coefficient detecting section is in the medium or low region and to select the safe vehicle speed set by the second setting section when the road friction coefficient is in the high region.

Preferably, the deceleration control section causes a brake system mounted on the vehicle to perform automatic decelerating operation independently of a driver's brake pedal operation. The brake system includes a compressed air source, a hydraulic wheel brake for applying braking power to each wheel of the vehicle, and an air-over hydraulic booster for converting pneumatic pressure, supplied thereto from the compressed air source through a first line, into hydraulic pressure. The deceleration control section includes a valve, provided in a second line connecting the compressed air source and the air-over hydraulic booster, and a valve control section for controlling the valve.

An automatic deceleration control apparatus according to a further aspect of the invention comprises: a turning state detecting section for detecting a turning state of the vehicle; a lateral acceleration detecting section for detecting an actual lateral acceleration generated in the vehicle; a friction coefficient detecting section for detecting the friction coefficient of a road surface; a deceleration control section operable independently of a driver's braking operation and adapted to decelerate the vehicle so as to cause the actual lateral acceleration to be equal to or less than an allowable lateral acceleration when a turning motion of the vehicle is detected by the turning state detecting section; and a setting section for setting the allowable lateral acceleration in accordance with the road friction coefficient detected by the friction coefficient detecting section. The setting section sets the allowable lateral acceleration at a value which increases with increase in the road friction coefficient when the road friction coefficient falling within a medium or low region is detected by the friction coefficient detecting section. Further, the setting section restrains increase of the allowable lateral acceleration when the road friction coefficient falling within a high region is detected by the friction coefficient detecting section.

In the case where the vehicle turns on a road surface with a relatively low friction coefficient, according to this automatic deceleration control apparatus, the higher the road friction coefficient, the higher the value at which the allowable lateral acceleration is set is. Accordingly, the vehicle can fulfill its turning performance without being decelerated excessively. While the vehicle is turning on a high-friction road, the allowable lateral acceleration can be restrained from increasing, so that the vehicle body can be effectively prevented from excessively rolling.

DETAILED DESCRIPTION

Figure 1:
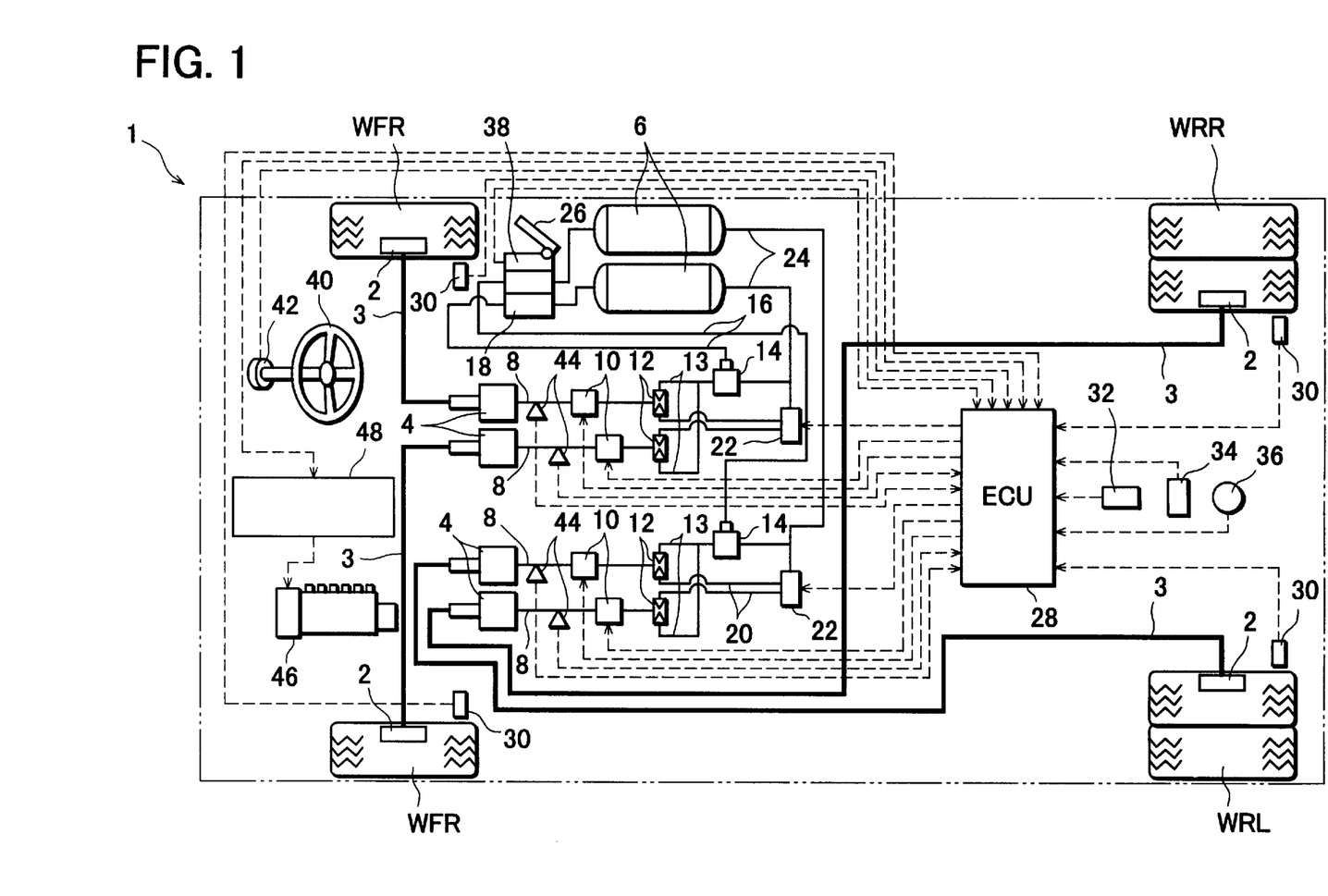
FIG. 1 is a diagram schematically showing a vehicular brake system furnished with an automatic deceleration control apparatus according to a first embodiment of the present invention.

Referring to FIG. 1, there is schematically shown an arrangement of a brake system that is applied to a large-sized vehicle 1, such as a truck or bus. In this vehicle 1, both left and right rear wheels $W_{RL}$ and $W_{RR}$, for use as driving wheels, are of a parallel double-wheel type. On the other hand, left and right front wheels $W_{FL}$ and $W_{FR}$, for use as steerable wheels, are of an ordinary type.

The brake system of the vehicle 1 is comprised of an air-over hydraulic brake in which a hydraulic brake is operated by utilizing pneumatic pressure. More specifically, a wheel cylinder 2 that is attached to each of the wheels $W_{FL}$, $W_{FR}$, $W_{RL}$, and $W_{RR}$ can actuate a wheel brake (not shown) to generate braking power when it is supplied with hydraulic pressure (braking pressure). Each wheel cylinder 2 is connected with a hydraulic pipe line 3 which is in turn connected with an air-over hydraulic booster 4 for converting pneumatic pressure into hydraulic pressure. A pneumatic pipe line 8 which extends from each hydraulic booster 4 is connected to an outlet port of a double-check valve 12, a shuttle valve. A pressure control valve 10 is inserted in each pneumatic pipe line 8.

Each double-check valve 12 has a pair of inlet ports, one of which is connected with a supply pipe line 13. Each pair of supply pipe lines 13 are connected to a corresponding one relay valve 14. More specifically, the two supply pipe lines 13 on the side of the front wheels $W_{FL}$ and $W_{FR}$ are connected to one relay valve 14, while the two supply pipe lines 13 on the side of the rear wheels $W_{RL}$ and $W_{RR}$ are connected to the other relay valve 14. Further, an admission pipe line 24 extends from each relay valve 14, and is connected to its corresponding air tank 6. Thus, a pneumatic line, which extends from one inlet port of each double-check valve 12 to the corresponding air tank 6 through the relay valve 14, is used in common for the front- and rear-wheel sides. Each air tank 6 is supplied with air from a compressor which is driven by an engine.

Further, a signal pressure pipe line 16 is connected to an input port of each relay valve 14. Each pipe line 16 is connected to its corresponding air tank 6 through a dual brake valve 18. Thus, a signal pressure line that extends from the brake valve 18 to the relay valve 14 through the signal pressure pipe line 16 is also used in common for the front- and rear-wheel sides.

On the other hand, an admission pipe line 20 is connected to the other inlet port of each double-check valve 12. Each pair of admission pipe lines 20 are connected to a corresponding one admission valve 22. More specifically, the two admission pipe lines 20 on the front-wheel side are connected to one admission valve 22, while the two admission pipe lines 20 on the rear-wheel side are connected to the other admission valve 22. Each admission pipe line 24 branches off at its downstream-side portion, and is connected to the relay valve 14 and the admission valve 22 corresponding thereto. Thus, an admission line that extends from the other inlet port of each double-check valve 12 to the air tank 6 through the admission valve 22 is also used in common for the front- and rear-wheel sides.

When a driver steps on a brake pedal 26, a signal pressure corresponding to his stepping force and the depth of depression (stepping-on measurement) of the pedal is supplied to the input port of each relay valve 14. As the signal pressure is supplied in this manner, relay valves 14 are opened, and their respective openings are controlled in accordance with the level of the signal pressure. Thus, pneumatic pressure is supplied from the air tanks 6 to the air-over hydraulic boosters 4 through the admission pipe lines 24, supply pipe lines 13, and pneumatic pipe lines 8. The boosters 4 convert the pneumatic pressure into hydraulic pressure. Under this hydraulic pressure, the wheel cylinders 2 actuate their corresponding wheel brakes to generate braking power that acts on the wheels $W_{FL}$, $W_{FR}$, $W_{RL}$, and $W_{RR}$. If the driver eases his stepping force on the brake pedal 26 or lessens the depth of depression, the signal pressure supplied to the relay valves 14 via the brake valve 18 is reduced correspondingly. If the brake pedal 26 is released entirely from the depression, the supply of the signal pressure is stopped completely. As the signal pressure supply is reduced or stopped in this manner, therefore, the supply of the pneumatic pressure through the relay valves 14 to the air-over hydraulic boosters 4 is also reduced or stopped.

This brake system incorporates an automatic deceleration control apparatus or automatic brake system. The control apparatus can automatically produce braking power in the wheel brakes for the individual wheels, thereby decelerating the vehicle 1, without the driver's stepping on the brake pedal 26.

The following is a detailed description of an automatic brake system according to a first embodiment of the present invention.

The admission valves 22 and the pressure control valves 10 are each formed of a solenoid-operated directional control valve whose operation is controlled by an electronic control unit (ECU) 28. When in its non-operating position, each admission valve 22 stops pneumatic pressure from being introduced through its corresponding admission pipe line 24, and allows the admission pipe lines 20 to open into the atmosphere. When each valve 22 is shifted to its operating position, on the other hand, it disconnects the pipe lines 20 from the atmosphere and allows the pipe lines 24 and 20 to communicate with one another. Thereupon, the pneumatic pressure can be supplied from the air tanks 6 to the air-over hydraulic boosters 4 through the admission pipe lines 24 and 20 and the pneumatic pipe lines 8.

Figure 2:
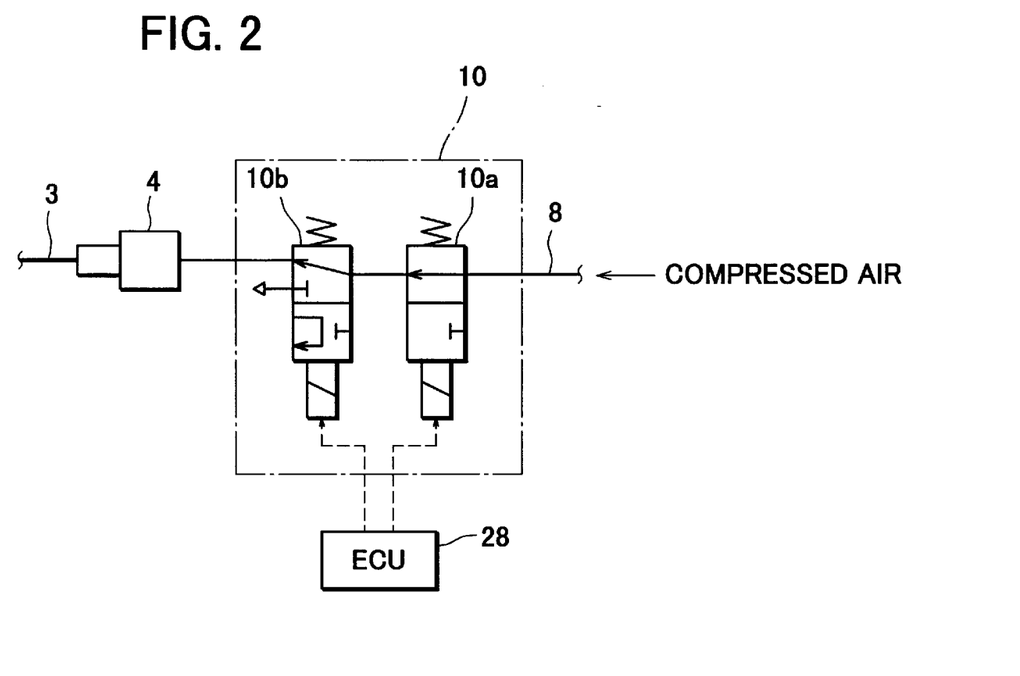
FIG. 2 is a detailed diagram showing an arrangement of a pressure control valve shown in FIG. 1.

As shown in FIG. 2, each pressure control valve 10 is formed of a valve unit that includes two built-in solenoid valves of different types. Further, the valve 10 has three ports, i.e., inlet, outlet, and exhaust ports, and contains therein a solenoid-operated retaining valve 10a of an ON/OFF type and a solenoid-operated exhaust valve 10b of a directional control type.

Normally, that is, when two solenoids are de-energized, the retaining valve 10a and the exhaust valve 10b are in an open position and a non-operating position, respectively, as shown in FIG. 2. Hence, the inlet and outlet port of each pressure control valve 10 communicate each other so that the corresponding pneumatic pipe line 8 is open. When the admission pipe line 22 is actuated in this state, therefore, pneumatic pressure can be supplied from the air tank 6 to the air-over hydraulic booster 4, that is, admission can be carried out.

If only the retaining valve 10a is actuated at the time of admission, on the other hand, the inlet port of the pressure control valve 10 is closed, so that further admission or air supply to its corresponding air-over hydraulic booster 4 is stopped. The already supplied pneumatic pressure, however, is kept as it is.

When the ECU 28 energizes the solenoid of the exhaust valve 10b as well as the retaining valve 10a, the exhaust valve is also shifted to its operating position. In this state, the outlet and exhaust ports of the pressure control valve 10 communicate with each other. Thereupon, compressed air supplied to the air-over hydraulic booster 4 is exhausted or discharged from the outlet port of the control valve 10 into the atmosphere through the outlet port of the valve 10.

Thus, according to this automatic brake system, the admission valves 22 are shifted to supply pneumatic pressure to the air-over hydraulic boosters 4 as the shift of the pressure control valves 10 is controlled. By doing this, the hydraulic pressure supplied to each wheel cylinder 2 can be adjusted to obtain desired braking power.

In operating the automatic brake system constructed in this manner, the ECU 28 is supplied with sensor signals from various sensors that are used to detect the turning state of the vehicle 1, and more specifically, the kinetic conditions of the vehicle 1 and the driver's driving operation. Among these sensors, sensors for detecting the kinetic conditions include wheel speed sensors 30 for individually detecting the respective revolution speeds of the wheels $W_{FL}$, $W_{FR}$, $W_{RL}$, and $W_{RR}$, a longitudinal acceleration sensor 32 for detecting a longitudinal acceleration that acts on the body of the vehicle, a lateral acceleration sensor 34 for detecting a lateral acceleration, a yaw rate sensor 36 for detecting a yaw rate that affects the vehicle body, etc. Sensors for detecting the driver's driving operation include a pedal stroke sensor 38 for detecting the depth of depression of the brake pedal 26, i.e., pedal stroke, a steering-wheel angle sensor 42 for detecting the rotational angle of a steering wheel 40, etc.

Located on the lower-stream side of each pneumatic pressure pipe line 8 is a brake air pressure sensor 44 for detecting the pneumatic pressure supplied to each corresponding air-over hydraulic booster 4, that is, brake air pressure. A sensor signal from the sensor 44 is also applied to the input of the ECU 28.

Further, the ECU 28 is connected electrically with an electronic governor controller 48, which delivers a command signal directly to an electronic governor 46 for controlling the fuel injection quantity.

Figure 3:
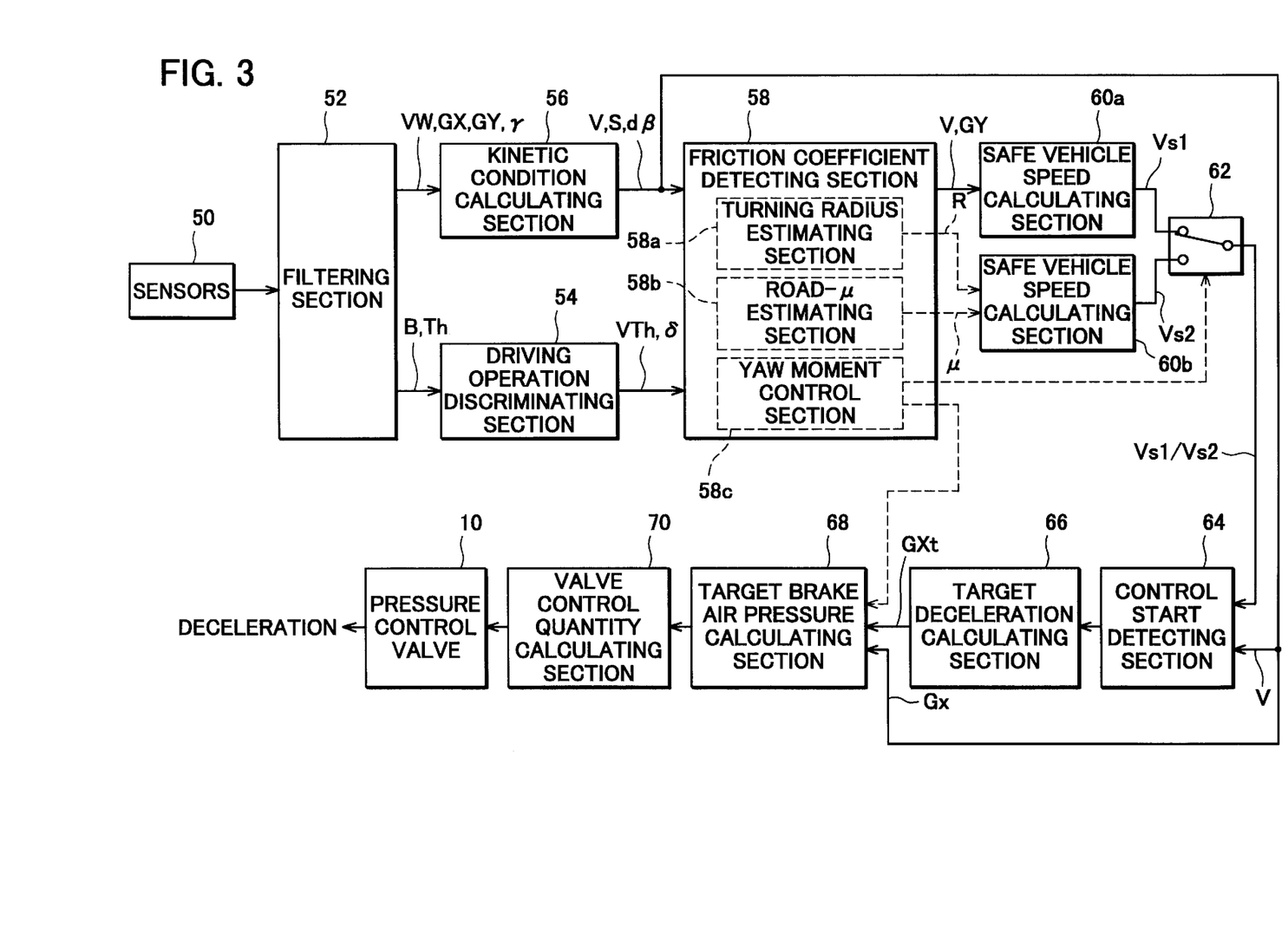
FIG. 3 is a block diagram illustrating various functions of an ECU, shown in FIG. 1, in respect of automatic deceleration control.

FIG. 3 shows a process in which the automatic brake system is actuated to decelerate the vehicle 1 after various sensor signals are processed in the ECU 28. That is, an example of a function of the automatic deceleration control apparatus is shown in FIG. 3.

Referring to FIG. 3, the sensor signals from the various sensors (block 50) are filtered by means of a filter 52. In arithmetic circuits 54 and 55, the kinetic conditions of the vehicle 1 and the driver's driving operation are calculated or determined by arithmetic operation. More specifically, in the arithmetic circuit 54, it is determined whether or not the vehicle 1 is being braked and whether or not the vehicle 1 is turning, on the basis of a pedal stroke B and a steering-wheel angle Th detected by means of the pedal stroke sensor 38 and the steering-wheel angle sensor 42. A steering-wheel angular speed $V_{Th}$ is computed from the steering-wheel angle Th, while a front-wheel steering angle δ is obtained by dividing the steering-wheel angle Th by a known steering-gear ratio.

In the arithmetic circuit 56, various variables, such as a vehicle body speed V, slip factor S of each wheel, gravitational center slip angular speed dβ, etc., are computed according to a wheel speed $V_W$ for each wheel, longitudinal acceleration $G_X$, lateral acceleration $G_Y$, yaw rate γ, etc.

Another arithmetic circuit 58 is supplied with the filtered signals from the various sensors 50 through the arithmetic circuits 54 and 56, individually. The driving operation information and kinetic condition information computed by the arithmetic circuits 54 and 56 are also supplied to the arithmetic circuit 58.

In the arithmetic circuit 58, the coefficient of friction of a road surface on which the vehicle 1 is running is detected while the vehicle is turning. This friction coefficient detecting means (friction coefficient detecting section) or the arithmetic circuit 58 includes a turning radius estimating section 58a, road friction coefficient ($\mu$) estimating section 58b, and yaw moment control section 58c. More specifically, in the turning radius estimating section 58a, the turning radius of the running vehicle 1 is arithmetically estimated from an equation of circular motion of mass. In the road-$\mu$ estimating section 58b, the road-$\mu$ is arithmetically estimated from the longitudinal and lateral accelerations $G_X$ and $G_Y$.

More specifically, a turning radius R can be computed as follows:

$$R = V^2/G_Y.$$

On the other hand, the road-$\mu$ can be computed as follows:

$$\mu = (G_X^2 + G_Y^2)^{1/2}.$$

Before explaining the yaw moment control section 58c, conventional yaw moment control will be described in brief. Yaw moment control for the vehicle 1 is an attitude control technique for stabilizing the turning behavior of the vehicle 1 in such a manner that a turning yaw moment or restoration yaw moment is generated in the vehicle by causing a braking power difference between, for example, front and rear diagonal wheels while the vehicle is turning.

Thus, based on the braking power difference between the wheels to be controlled, the yaw moment control section 58c sets a target brake air pressure for each of these wheels. In the control section 58c, more specifically, a target yaw rate for the vehicle is computed on the basis of the vehicle body speed V and the front-wheel steering angle δ. A required yaw moment, that is, a yaw moment for efficiently canceling an under- or over-steering effect of the vehicle, is computed on the basis of a deviation between the target yaw rate and a detected yaw rate. The target brake air pressure for each controlled-object wheel is set in accordance with the obtained required yaw moment. In the yaw moment control section 58c, the yaw rate deviation is compared with a reference value or threshold value which determines starting conditions for yaw moment control. If the yaw rate deviation exceeds the threshold value, it is concluded that the yaw moment control should be executed. If the yaw rate deviation is not greater than the threshold value, on the other hand, it is concluded that the yaw moment control need not be executed.

For the following reason, such yaw moment control is not expected to be executed when the vehicle turns as it runs on a high-$\mu$ road surface with a relatively high friction coefficient. The turning vehicle tends to be under- or over-steered on a medium- or low-$\mu$ road surface with a relatively low friction coefficient, since the tire grip performance approaches its limit in this state. Since the tire grip performance is good enough on a high-$\mu$ road, on the other hand, the vehicle has hardly any gravitational center slip angle, so that its turning drive line is stable.

If the yaw moment control of the turning vehicle 1 is not started in carrying out the friction coefficient detection in the arithmetic circuit 58, therefore, the circuit 58 concludes that the road friction coefficient is in a high region. If the yaw moment control is started, on the other hand, the road friction coefficient is concluded to be in a medium or low region.

Setting means (setting section) or next arithmetic circuits 60a and 60b for setting safe vehicle speeds simultaneously compute safe speeds of the turning vehicle 1. The circuit 60a computes a safe vehicle speed Vs1 for the case where the road friction coefficient is in the high region (high-$\mu$). On the other hand, the circuit 60b computes a safe vehicle speed Vs2 for the case where the road friction coefficient is in the medium or low region (medium- or low- $\mu$).

Both the safe vehicle speeds Vs1 and Vs2 are set at values such as to restrict lateral acceleration generated in the turning vehicle. More specifically, before setting the safe vehicle speed Vs1 for the high-$\mu$ road, a limit lateral acceleration Glim at which the vehicle 1 cannot roll over is previously set on the assumption that the rollover limit of the vehicle is reached in advance of the tire grip limit while the vehicle is turning on a high-$\mu$ road. The safe vehicle speed Vs1 is set as a limit vehicle speed that can be obtained by limiting the vehicle speed V in accordance with the ratio between the limit lateral acceleration Glim and the detected lateral acceleration $G_Y$. Thus, the safe vehicle speed Vs1 is defined as follows:

$$Vs1 = V \times (\text{Glim}/G_Y).$$

As seen from the above expression, the safe vehicle speed Vs1 is set as a vehicle speed that restricts the detected lateral acceleration $G_Y$ to the limit lateral acceleration Glim or less, so that the increase in the safe vehicle speed can be restrained while the actual road friction coefficient increases. The limit lateral acceleration Glim should be set appropriately as a specific constant at which the vehicle 1 cannot roll over, in consideration of the height of the gravitational center, tread, etc. of the vehicle 1.

In contrast with this, the safe vehicle speed Vs2 for the medium- or low-$\mu$ road is computed on the assumption that a limit lateral acceleration at which the tire grip force disappears depends on the road friction coefficient. Based on the estimated turning radius R and the road friction coefficient $\mu$, the safe vehicle speed Vs2 is set, according to an equation of circular motion of mass, as a vehicle speed at which a coefficient of the lateral acceleration, generated in the vehicle 1 as the vehicle turns with the estimated turning radius, is restricted to a value lower than the estimated road friction coefficient $\mu$. Thus, the safe vehicle speed Vs2 is defined as follows:

$$Vs2 = (K \cdot \mu \cdot g \cdot R)^{1/2},$$

where K and g are a safety factor and a gravity acceleration, respectively. As seen from the above expression, the safe vehicle speed Vs2 is set as a vehicle speed at which the lateral acceleration coefficient is represented by $K \cdot \mu$. As the estimated road friction coefficient $\mu$ increases, therefore, the safe vehicle speed Vs2 also increases. The safety factor K should be set at such an appropriate value as to prevent the vehicle 1 from spinning or drifting out on an actual medium- or low-$\mu$ road.

Figure 4:
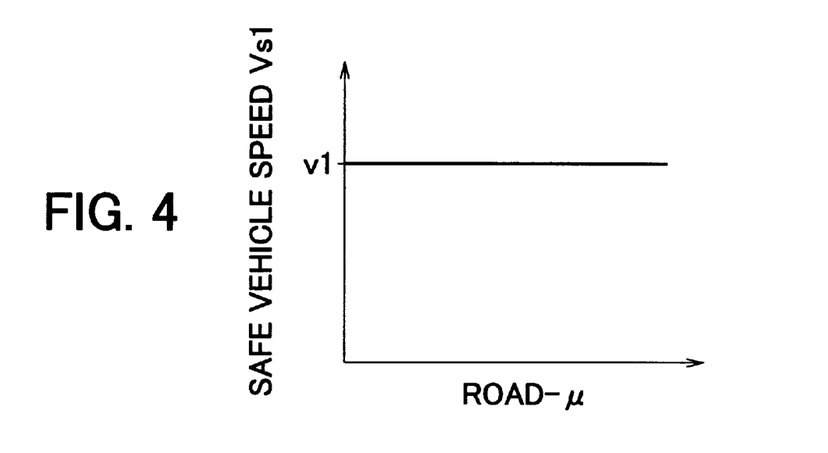
FIG. 4 is a graph showing an example of a $\mu$-Vs curve for a high-$\mu$ road.
Figure 5:
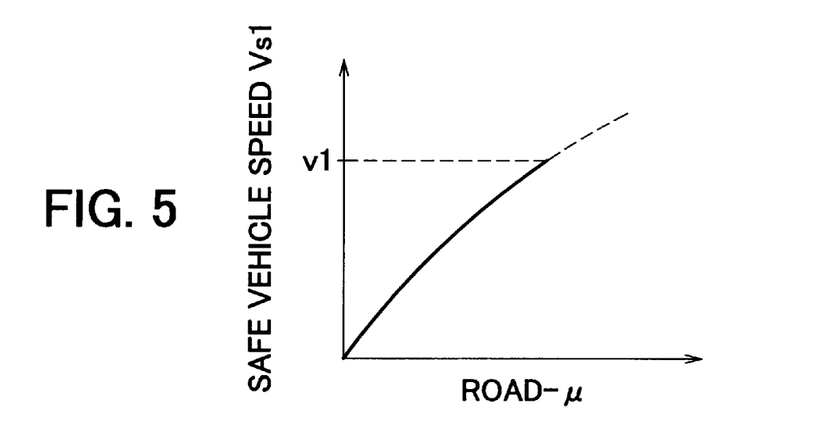
FIG. 5 is a graph showing an example of a $\mu$-Vs curve for a medium- or low-$\mu$ road.
Figure 6:
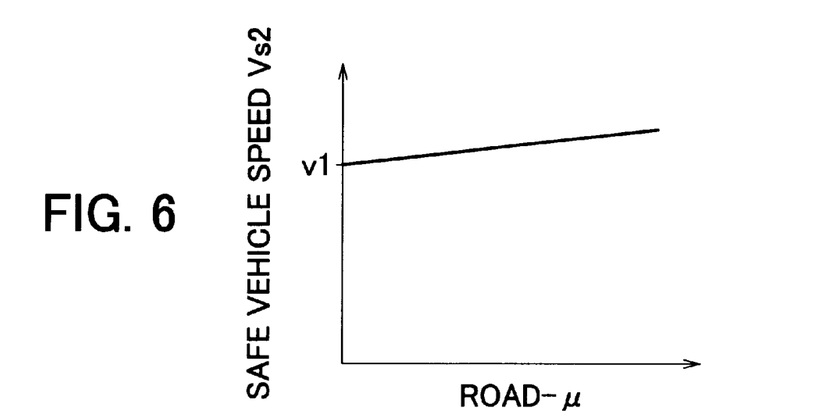
FIG. 6 is a graph showing another example of the $\mu$-Vs curve for a high-$\mu$ road.

FIG. 4 shows a $\mu$-Vs curve representing the relation between the road friction coefficient and the vehicle speed Vs1 set in the arithmetic circuit 60a for a case where the turning radius R takes a certain value. FIG. 5 shows the relation between the road friction coefficient and the vehicle speed Vs2 set in the arithmetic circuit 60b with the lateral acceleration $G_Y$ and the vehicle speed V at certain values. As shown in FIG. 4, the $\mu$-Vs curve for a high-$\mu$ road has no gradient. In other words, the safe vehicle speed Vs1 takes a fixed value v1 as the road friction coefficient increases. As shown in FIG. 5, on the other hand, the $\mu$-Vs curve for a low-$\mu$ road has a gradient. That is, the safe vehicle speed Vs2 increases as the road friction coefficient increases. Instead of reducing the gradient of the $\mu$-Vs curve to zero as shown in FIG. 4, the safe vehicle speed may be set to slightly increase with the increase in the road friction coefficient, as shown in FIG. 6. Also in this case, the increase of the safe vehicle speed Vs1 must be restricted to such a value as to make the lateral acceleration $G_Y$ not higher than the limit lateral acceleration Glim.

One of the safe vehicle speeds Vs1 and Vs2 thus set in the arithmetic circuits 60a and 60b, individually, is fed to a decision circuit 64 through a switching circuit (safe vehicle speed selecting section) 62.

Normally, the switching circuit 62 is in the illustrated shift position at which the arithmetic circuit 60a and the decision circuit 64 are connected. The circuit 62 is shifted from the illustrated position when the aforesaid yaw moment control is started so that a control execution signal from the yaw moment control section 58c is inputted and that Vs1>Vs2 is established between the two inputs Vs1 and Vs2. When the yaw moment control is finished so that the input of the control execution signal from the control circuit 58a is stopped, thereafter, the switching circuit 62 is returned to the illustrated position.

The decision circuit 64 is supplied with the vehicle speed V from the arithmetic circuit 56. In the decision circuit 64, a speed deviation between the safe vehicle speed Vs (Vs1 or Vs2) and the vehicle speed V and a threshold value for determining starting conditions for automatic deceleration control are compared. If the speed deviation is greater than the threshold value, it is concluded that the automatic deceleration control should be started.

In an arithmetic circuit 68, a target deceleration is computed according to the aforesaid speed deviation. More specifically, a target deceleration $G_x t$ is calculated as follows:

$$G_x t = Kp \cdot (Vs - V),$$

where Kp is a feedback gain.

After the target deceleration $G_x t$ is computed, the target brake air pressure for each wheel is computed in the arithmetic circuit 68 in accordance with the target deceleration. In the present embodiment, those three other wheels of the vehicle than the outside rear wheel (as viewed in the turning direction of the vehicle) are subject to the automatic deceleration control.

More specifically, in order to obtain the target brake air pressure, the difference between the target deceleration $G_x t$ and the actual deceleration from which cornering drag is subtracted is multiplied by a feedback gain and the integral of the just-mentioned difference is multiplied by a feedback gain, and then the resultant two products are added together. The target brake air pressure thus obtained is common to all of the three wheels.

In the case where the yaw moment control is executed, moreover, the arithmetic circuit 68 obtains a total target brake air pressure for the wheels subjected to the yaw moment control, by adding the target brake air pressure for the automatic deceleration control to the target brake air pressure obtained in the yaw moment control section 58c.

In an arithmetic circuit 70, a valve control quantity (valve control signal) for driving the pressure control valve 10 for each controlled-object wheel is obtained in accordance with a corresponding one of the target brake air pressure and the total brake air pressure.

If the yaw moment control is not executed while the vehicle 1 is turning, the switching circuit 62 is in the illustrated shift position, so that the safe vehicle speed Vs1 is supplied to the decision circuit 64.

In this case, if the decision circuit 64 concludes that the automatic deceleration control is to be started, an actuating signal from a command circuit (not shown) of the ECU 28 is delivered to the admission valve 22 for each controlled-object wheel, whereby the valve position is shifted to the operating position. In the arithmetic circuit 68, such a target deceleration $G_x 1$ as to reduce the vehicle speed V to the level of the safe vehicle speed Vs1 or below is obtained. Thereafter, the target deceleration $G_x 1$ is converted into the target brake air pressure and then into the valve control quantity by means of the arithmetic circuits 68 and 70, in succession. This valve control quantity is supplied from the arithmetic circuit 70 to the pressure control valve 10 corresponding to the controlled-object wheel. Since the control valve 10 is switched in accordance with the valve control quantity, the aforesaid automatic brake system is actuated to decelerate the vehicle 1 to the safe vehicle speed Vs1 or below.

In the case where the yaw moment control is executed and the safe vehicle speed Vs2 is set at a value not higher than v1 shown in FIG. 5, on the other hand, the aforesaid condition Vs1>Vs2 is satisfied, and the switching circuit 62 is shifted from the position shown in FIG. 3. In this case, the vehicle 1 is decelerated to the safe vehicle speed Vs2 or below.

Even if it is concluded that the vehicle 1 is turning on a medium- or low-$\mu$ road without undergoing the yaw moment control, however, the condition Vs1>Vs2 cannot be satisfied when the safe vehicle speed Vs2 is set, depending on the road friction coefficient $\mu$, to a value which exceeds v1. In this case, the switching circuit 62 is not shifted from the illustrated position, or if already shifted, is returned to the illustrated position. Even when the yaw moment control is executed, therefore, the safe vehicle speed delivered from the switching circuit 62 cannot exceed Vs1.

During the automatic deceleration control, another signal is separately delivered to the electronic governor controller 48. In the controller 48, the fuel injection quantity is determined in accordance with the target brake air pressure for automatic deceleration control. In consequence, the automatic brake system is actuated, and at the same time, the output of the engine is lowered. Thus, the vehicle 1 can be decelerated more effectively.

By executing the automatic deceleration control described above, the vehicle 1 can be turned at a speed not higher than the safe vehicle speed which varies depending on the road friction coefficient. Thus, while the vehicle is turning on a medium- or low-$\mu$ road, it can display satisfactory tire grip performance as it runs. On a high-$\mu$ road, on the other hand, the vehicle can safely run without reaching its rollover limit. The aforesaid switching circuit enables the vehicle to turn on a medium- or low-$\mu$ road without reaching the rollover limit. This feature is especially useful for the large-sized vehicle such as a truck or bus.

Figure 7:
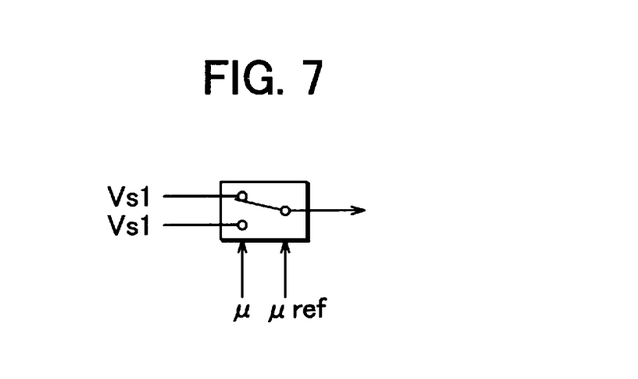
FIG. 7 is a diagram showing a modification of a switching circuit shown in FIG. 3.

The switching operation of the switching circuit 62, that is, the selection between the safe vehicle speeds Vs1 and Vs2, may be performed on the basis of comparison between the road friction coefficient $\mu$ estimated in the road-$\mu$ estimating section 58b and a threshold value $\mu$ref, as shown in FIG. 7, irrespective of whether or not the yaw moment control is executed.

The following is a description of an automatic deceleration control apparatus according to a second embodiment of the present invention.

Figure 8:
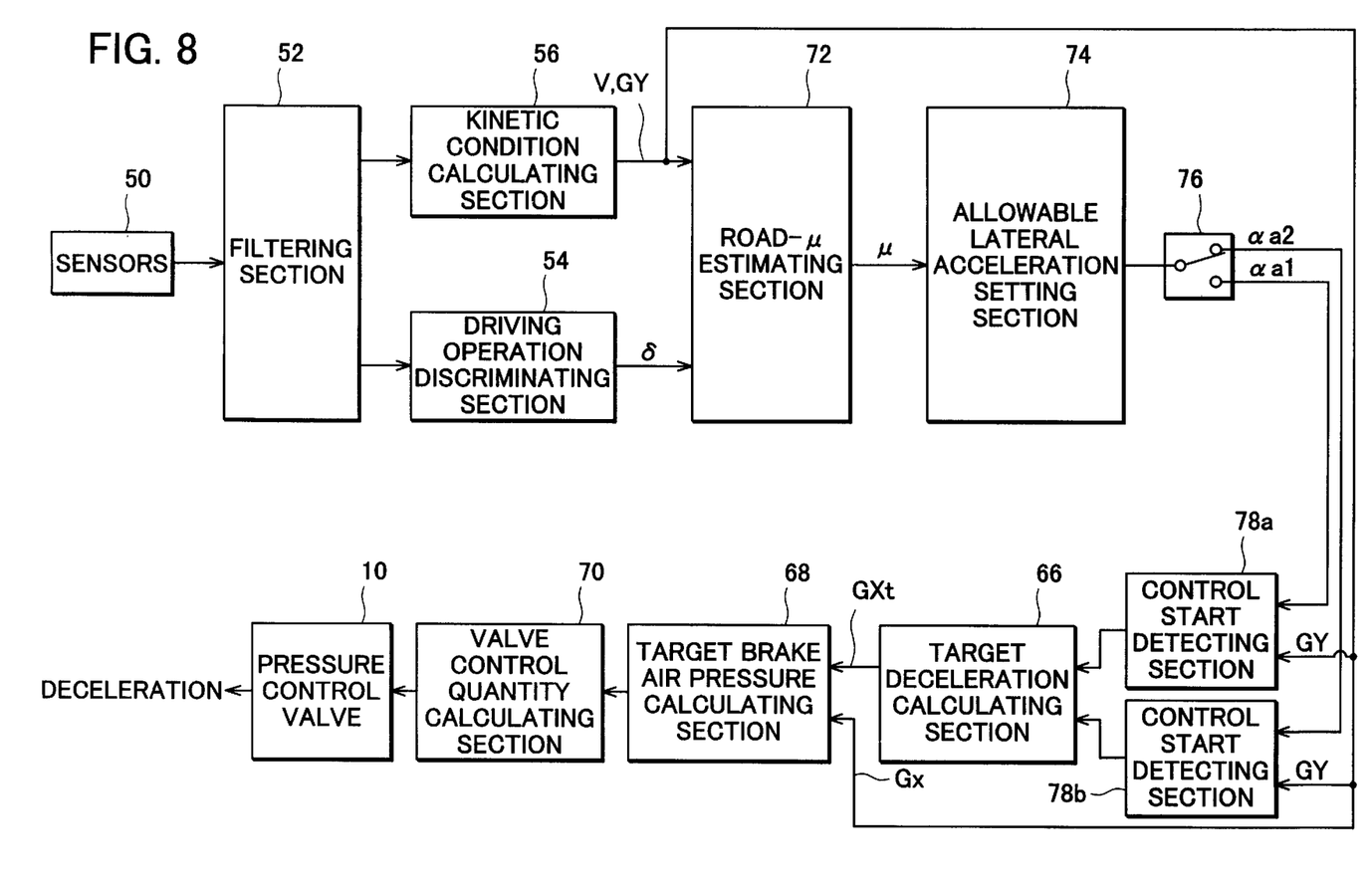
FIG. 8 is block diagram illustrating various functional sections of an ECU of an automatic deceleration control apparatus according to a second embodiment of the present invention.

The apparatus according to the present embodiment is characterized in that arithmetic circuits 72 and 74, switching circuit 76, and decision circuits 78a and 78b shown in FIG. 8 are provided in place of the circuits 58 to 64 shown in FIG. 3. In other respects, the arrangement of the second embodiment resembles that of the first embodiment, and therefore, will not be described repeatedly.

In the arithmetic circuit 72, which serves as road friction coefficient detecting means, the road friction coefficient $\mu$ is detected by arithmetic operation. More specifically, the road friction coefficient $\mu$ is estimated according to an equation of circular motion of mass by computation based on the lateral acceleration $G_Y$ detected by the lateral acceleration sensor 34 as lateral acceleration detecting means, vehicle speed V, and front-wheel steering angle δ.

The allowable value of the lateral acceleration generated in the turning vehicle 1, that is, allowable lateral acceleration, is set in the arithmetic circuit 74, which serves as allowable lateral acceleration setting means. Based on the estimated road friction coefficient $\mu$, an allowable lateral acceleration αa1 is computed according to the following expression:

$$\alpha a1 = K \cdot (\mu \cdot g),$$

where K and g are the safety factor and the gravity acceleration, respectively.

On the other hand, an allowable lateral acceleration αa2 is set as an upper limit value of the lateral acceleration at which the turning vehicle 1 cannot reach its rollover limit.

In the arithmetic circuit 74, the computed allowable lateral acceleration αa1 and the upper limit value αa1 are compared. If αa1≦αa2 is given, αa1 is set as the allowable lateral acceleration in the arithmetic circuit 74. If αa1>αa2 is given, on the other hand, the upper limit value αa2 is set as the allowable lateral acceleration. The set value is delivered from the arithmetic circuit 74.

As this is done, the allowable lateral accelerations αa1 and αa2 are supplied to the decision circuits 78a and 78b, respectively, through the switching circuit 76.

Normally, the switching circuit 76 is in the illustrated position, where it connects the arithmetic circuit 74 and the decision circuit 78a. When the allowable lateral acceleration αa2 is delivered from the arithmetic circuit 74, the switching circuit 76 is shifted from the illustrated position. When the allowable lateral acceleration αa1 is delivered from the arithmetic circuit 74, thereafter, the circuit 76 is restored to the illustrated position.

The lateral acceleration $G_Y$ from the arithmetic circuit 56 is also supplied to the decision circuits 78a and 78b. In each of the circuits 78a and 78b, a deviation between the supplied allowable lateral acceleration αa1 or αa2 and the detected lateral acceleration $G_Y$ is compared with a threshold value for determining the starting conditions for automatic deceleration control. If the lateral acceleration deviation exceeds this threshold value, it is concluded that the automatic deceleration control is to be started. If the switching circuit 76 is in the illustrated shift position, the aforesaid decision process is executed by the decision circuit 78a only. If the circuit 76 is switched from the illustrated position, the decision process is executed by the decision circuit 78b.

In an arithmetic circuit 66 in the next stage, the target deceleration is computed in the same manner as in the aforesaid case. In this case, however, the target deceleration $G_Xt$ can be obtained from the aforesaid lateral acceleration deviation.

As in the case shown in FIG. 3, thereafter, the target brake air pressure for each wheel is computed in the arithmetic circuit 68, while the valve control quantity is obtained in the arithmetic circuit 70.

While the vehicle 1 is turning, the arithmetic circuit 74 sets the allowable lateral acceleration in the aforesaid manner on the basis of the road friction coefficient $\mu$ estimated in the arithmetic circuit 72.

Figure 9:
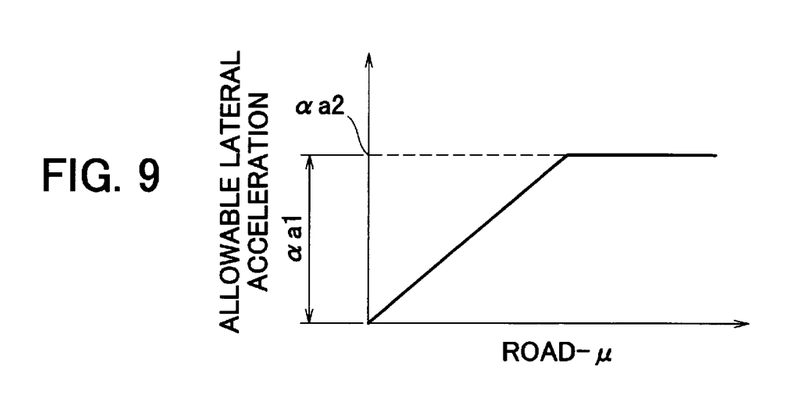
FIG. 9 is a $\mu$-$\alpha$a diagram showing an example of an allowable lateral acceleration characteristic.
Figure 10:
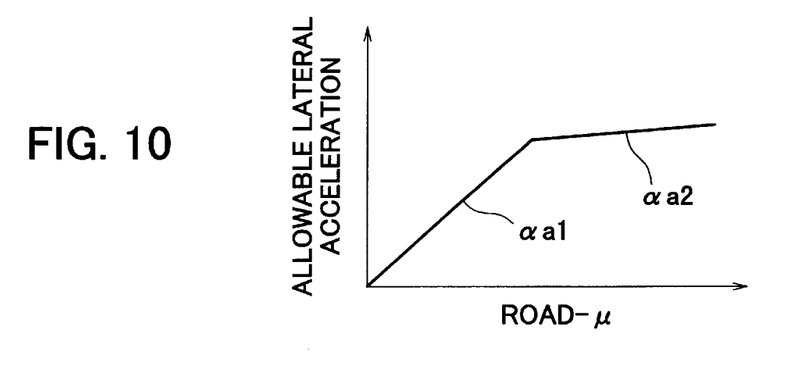
FIG. 10 is a $\mu$-$\alpha$a diagram showing another example of the allowable lateral acceleration characteristic.

Referring now to FIG. 9, there is shown a characteristic curve representing the allowable lateral acceleration set in the arithmetic circuit 74. In the region where the road friction coefficient $\mu$ is low, the characteristic curve has a gradient K. In this case, the allowable lateral acceleration αa1 is delivered from the arithmetic circuit 74. In the high-$\mu$ region, on the other hand, the characteristic curve has no gradient, and the output from the circuit 74 is restricted to the upper limit value αa2. Thus, the value of the allowable lateral acceleration set in the arithmetic circuit 74 increases as the road friction coefficient $\mu$ increases in the medium- or low-$\mu$ region. In the high-$\mu$ region, however, the set value is restrained from increasing and is fixed. Alternatively, as shown in FIG. 10, the allowable lateral acceleration may be made slightly to increase as the road friction coefficient $\mu$ increases, without reducing the high-region gradient of the characteristic curve to zero. Also in this case, however, the upper limit value αa2 of the allowable lateral acceleration must be restricted to such a value as to prevent the vehicle 1 from reaching its rollover limit.

Thus, if the lateral acceleration $G_Y$ generated in the turning vehicle 1 is about to exceed the allowable lateral acceleration αa1 with the estimated road friction coefficient in the medium or low region, the vehicle 1 is automatically decelerated so that lateral acceleration $G_Y$ is restricted to the level of the allowable lateral acceleration αa1 or below.

If the estimated road friction coefficient is in the high region, on the other hand, the vehicle 1 is automatically decelerated lest the lateral acceleration $G_Y$ exceed the upper limit value αa2 of the allowable lateral acceleration.

Under the automatic deceleration control executed according to the embodiment shown in FIG. 8, the vehicle 1 can safely turn without exceeding the allowable lateral acceleration which varies depending on the road friction coefficient. More specifically, the turning vehicle can display satisfactory tire grip performance as it runs on a medium- or low-$\mu$ road. On a high-$\mu$ road, on the other hand, the vehicle can safely run without reaching its rollover limit. Since the allowable lateral acceleration has its upper limit value, moreover, the vehicle is prevented from reaching the rollover limit even when it turns on a medium- or low-$\mu$ road. The arithmetic circuit 56 may be used to compute and detect the lateral acceleration according to the vehicle speed V and the steering angle δ, instead of sensing the actual lateral acceleration by means of the lateral acceleration sensor 34.

The following is a description of an automatic deceleration control apparatus according to a third embodiment of the present invention.

Figure 11:
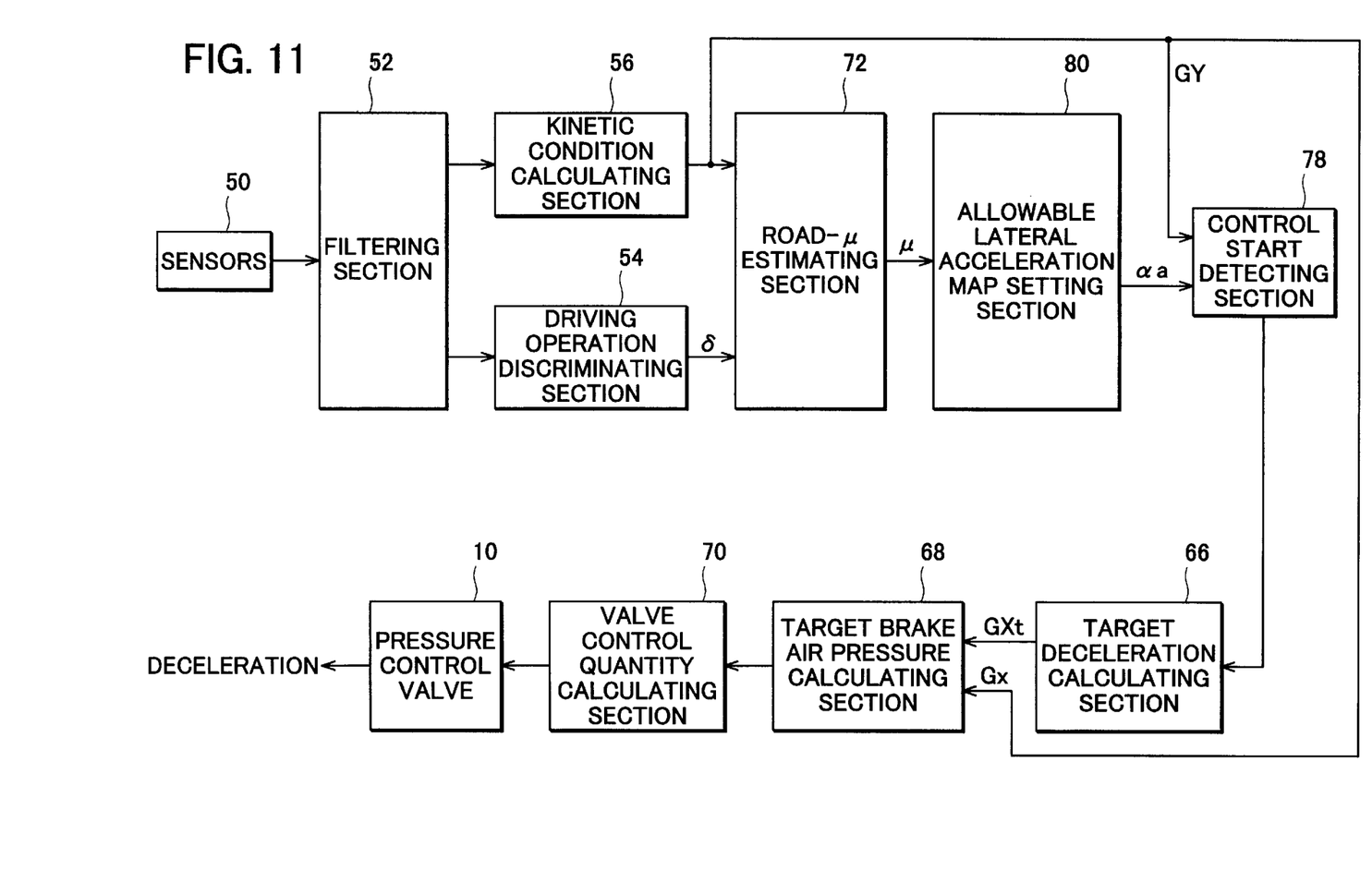
FIG. 11 is a block diagram illustrating various functional sections of an ECU of an automatic deceleration control apparatus according to a third embodiment of the present invention.

The apparatus according to the present embodiment is characterized in that an arithmetic circuit 80 shown in FIG. 11 is provided in place of the arithmetic circuit 74 and the switching circuit 76 according to the second embodiment shown in FIG. 6 and that the decision circuits 78a and 78b are integrated into one decision circuit 78. In other respects, the arrangement of the third embodiment is similar to the first and second embodiments, and therefore, will not be described repeatedly.

Figure 12:
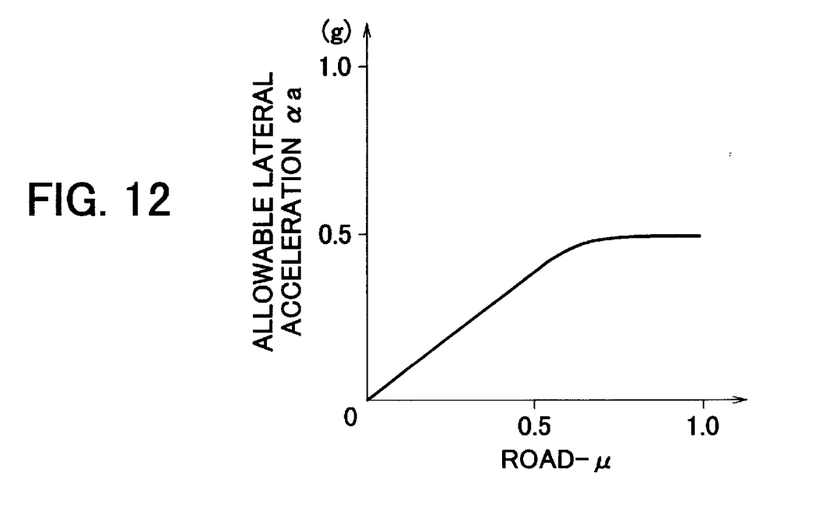
FIG. 12 is a map from which the allowable lateral acceleration is determined.

In the arithmetic circuit 80, an allowable lateral acceleration αa is set with use of a map. More specifically, in the circuit 80, the allowable lateral acceleration αa corresponding to the estimated road friction coefficient $\mu$ is read from the map or $\mu$-αa diagram of FIG. 12, and is set. Also in this case, as seen from FIG. 12, the set allowable lateral acceleration αa corresponding to the medium or low region of the estimated road friction coefficient $\mu$ increases as the coefficient $\mu$ increases. In the high-$\mu$ region, the allowable lateral acceleration αa is restrained from increasing.

Only one threshold value is set in the decision circuit 78, and whether or not the automatic deceleration control should be started is determined based on the threshold value and a deviation between the detected lateral acceleration $G_Y$ and the allowable lateral acceleration $\alpha a$.

It is to be understood, therefore, that the same effects of the foregoing embodiments can be obtained by executing automatic deceleration control by means of the apparatus according to the present embodiment.

The present invention is not limited to the embodiments described above. For example, the object wheels to be subjected to automatic deceleration control are not limited to the aforementioned three wheels, and all four wheels may be subject to the automatic deceleration control. Further, the brake system of the vehicle 1 is not limited to the air-over hydraulic brake, and may alternatively be a full-air brake.

Besides the automatic brake system according to each of the embodiments described herein, moreover, the aforesaid restriction on the engine output may serve as an effective measure to decelerate the vehicle 1. Thus, the vehicle 1 can be decelerated to a substantial degree while it is turning by controlling the output torque of the engine.

What is claimed is:

1. An automatic deceleration control method for automatically decelerating a vehicle in accordance with a turning state of the vehicle, thereby stabilizing the turning behavior of the vehicle, comprising the steps of:
   (a) detecting the turning state of the vehicle;
   (b) detecting a friction coefficient of a road surface on which the vehicle is running;
   (c) setting a safe vehicle speed in accordance with the turning state detected in said step (a) and the road friction coefficient detected in said step (b) such that the safe vehicle speed is set at a value which increases with increase in the road friction coefficient, when the road friction coefficient falling within a medium or low region is detected in said step (b);
   (d) setting a safe vehicle speed in accordance with the turning state detected in said step (a) and the road friction coefficient detected in said step (b) while restraining increase of the safe vehicle speed when the road friction coefficient falling within a high region is detected in said step (b); and
   (e) automatically decelerating the vehicle so as to cause the actual vehicle speed to be equal to or less than the safe vehicle speed set in said step (c) or (d) when a turning motion of the vehicle is detected in said step (a).

2. The automatic deceleration control method according to claim 1, wherein said step (d) includes setting the safe vehicle speed at a fixed value corresponding to a maximum value of the safe vehicle speed set in said step (c) under the same turning state.

3. The automatic deceleration control method according to claim 1, wherein said step (d) includes setting the safe vehicle speed at a value which slightly increases, from a fixed value corresponding to a maximum value of the safe vehicle speed set in said step (c) under the same turning state, with increase in the road friction coefficient.

4. The automatic deceleration control method according to claim 1, wherein said step (c) includes setting the safe vehicle speed at a value not higher than a tire grip limit of the vehicle, and said step (d) includes setting the safe vehicle speed at a value not higher than a rollover limit of the vehicle.

5. The automatic deceleration control method according to claim 1, wherein said step (a) includes detecting an actual vehicle speed and an actual lateral acceleration, said step (c) including setting the safe vehicle speed in accordance with the road friction coefficient detected in said step (b) and a turning radius, calculated according to the actual vehicle speed and the actual lateral acceleration detected in said step (a), said step (d) includes setting the safe vehicle speed in accordance with the actual vehicle speed and the actual lateral acceleration detected in said step (a) and a preset rollover-limit lateral acceleration.

6. The automatic deceleration control method according to claim 1, wherein said step (b) includes concluding that the road friction coefficient is in the medium or low region when yaw moment control for operating a brake system so as to produce a braking power difference between wheels of the vehicle to thereby generate a yaw moment on the vehicle is carried out, and concluding that the road friction coefficient is in the high region when the yaw moment control is not carried out.

7. The automatic deceleration control method according to claim 1, wherein said step (b) includes concluding that the road friction coefficient is in the medium or low region when the detected road friction coefficient is lower than a preset threshold value, and concluding that the road friction coefficient is in the high region when the detected road friction coefficient is higher than the threshold value.

8. The automatic deceleration control method according to claim 1, wherein said step (a) includes detecting an actual longitudinal acceleration and an actual lateral acceleration, and said step (b) includes detecting the road friction coefficient in accordance with the actual longitudinal acceleration and the actual lateral acceleration detected in said step (a).

9. An automatic deceleration control method for automatically decelerating a vehicle in accordance with a turning state of the vehicle, thereby stabilizing turning behavior of the vehicle, comprising the steps of:
   (a) detecting the turning state of the vehicle;
   (b) detecting an actual lateral acceleration generated in the vehicle;
   (c) detecting a friction coefficient of a road surface on which the vehicle is running;
   (d) setting an allowable lateral acceleration at a value which increases with increase in the road friction coefficient when the road friction coefficient falling within a medium or low region is detected in said step (c);
   (e) setting an allowable lateral acceleration while restraining increase of the allowable lateral acceleration when the road friction coefficient falling within a high region is detected in said step (c); and
   (f) automatically decelerating the vehicle so as to cause the actual lateral acceleration detected in said step (b) to be equal to or less than the allowable lateral acceleration set in said step (d) or (e) when a turning motion of the vehicle is detected in said step (a).

10. The automatic deceleration control method according to claim 9, wherein said step (e) includes setting the allowable lateral acceleration at a fixed value corresponding to a maximum value of the allowable lateral acceleration set in said step (d) under the same turning state.

11. The automatic deceleration control method according to claim 9, wherein said step (e) includes setting the allowable lateral acceleration at a value which slightly increases, from a fixed value corresponding to a maximum value of the allowable lateral acceleration set in said step (d) under the same turning state, with increase in the road friction coefficient.

12. The automatic deceleration control method according to claim 9, wherein said step (d) includes setting the allowable lateral acceleration at a value not higher than a tire grip limit of the vehicle, and said step (e) includes setting the allowable lateral acceleration at a value not higher than a rollover limit of the vehicle.

13. An automatic deceleration control apparatus for automatically decelerating a vehicle in accordance with a turning state of the vehicle, thereby stabilizing turning behavior of the vehicle, comprising:
   a turning state detecting section for detecting the turning state of the vehicle;
   a friction coefficient detecting section for detecting a friction coefficient of a road surface;
   a deceleration control section operable independently of a driver's braking operation and adapted automatically to decelerate the vehicle so as to cause an actual vehicle speed to be equal to or less than a safe vehicle speed when a turning motion of the vehicle is detected by said turning state detecting section; and
   a setting section for setting a safe vehicle speed in accordance with the turning state detected by the turning state detecting section, the setting section being adapted to set the safe vehicle speed at a value which increases with increase in the road friction coefficient when the road friction coefficient falling within a medium or low region is detected by the friction coefficient detecting section and to restrain increase of the safe vehicle speed when the road friction coefficient falling within a high region is detected by said friction coefficient detecting section.

14. The automatic deceleration control apparatus according to claim 13, wherein, when the road friction coefficient falling within the high region is detected by said friction coefficient detecting section, said setting section sets the safe vehicle speed at a fixed value corresponding to a maximum value of the safe vehicle speed set, under the same turning state, with respect to the road friction coefficient falling within the medium or low region.

15. The automatic deceleration control apparatus according to claim 13, wherein, when the road friction coefficient falling within the high region is detected by said friction coefficient detecting section, said setting section sets the safe vehicle speed at a value which slightly increases with increase in the road friction coefficient, from a fixed value corresponding to a maximum value of the safe vehicle speed set, under the same turning state, with respect to the road friction coefficient falling within the medium or low region.

16. The automatic deceleration control apparatus according to claim 13, wherein said setting section sets the safe vehicle speed at a value not higher than a tire grip limit of the vehicle when the road friction coefficient falling within the medium or low region is detected by said friction coefficient detecting section, and sets the safe vehicle speed at a value not higher than a rollover limit of the vehicle when the road friction coefficient falling within the high region is detected by said friction coefficient detecting section.

17. The automatic deceleration control apparatus according to claim 13, wherein said turning state detecting section includes a vehicle speed sensor for detecting an actual vehicle speed and a lateral acceleration sensor for detecting an actual lateral acceleration;
   said automatic deceleration control apparatus further comprises a turning radius estimating section for estimating a turning radius from the actual vehicle speed detected by the vehicle speed sensor and the actual lateral acceleration detected by the lateral acceleration sensor; and
   said setting section includes a first setting section for setting the safe vehicle speed in accordance with the road friction coefficient detected by the friction coefficient detecting section and the turning radius estimated by the turning radius estimating section, a second setting section for setting the safe vehicle speed in accordance with a preset rollover-limit lateral acceleration, the actual vehicle speed detected by the vehicle speed sensor, and the actual lateral acceleration detected by the lateral acceleration sensor, and a safe vehicle speed selecting section adapted to select the safe vehicle speed set by the first setting section when the road friction coefficient detected by the friction coefficient detecting section is in the medium or low region and to select the safe vehicle speed set by the second setting section when the road friction coefficient is in the high region.

18. The automatic deceleration control apparatus according to claim 17, wherein said safe vehicle speed selecting section selects the safe vehicle speed set by the first setting section when yaw moment control for operating a brake system so as to produce a braking power difference between wheels of the vehicle to thereby generate a yaw moment on the vehicle is carried out, and selects the safe vehicle speed set by the second setting section when the yaw moment control is not carried out.

19. The automatic deceleration control apparatus according to claim 17, wherein said safe vehicle speed selecting section selects the safe vehicle speed set by the first setting section when the road friction coefficient detected by the friction coefficient detecting section is lower than a preset threshold value, and selects the safe vehicle speed set by the second setting section when the detected road friction coefficient is higher than the threshold value.

20. The automatic deceleration control apparatus according to claim 13, wherein said turning state detecting section includes a longitudinal acceleration sensor for detecting an actual longitudinal acceleration and a lateral acceleration sensor for detecting an actual lateral acceleration, and said friction coefficient detecting section detects the road friction coefficient in accordance with the actual lateral acceleration detected by the lateral acceleration sensor and the actual longitudinal acceleration detected by the longitudinal acceleration sensor.

21. The automatic deceleration control apparatus according to claim 13, wherein said deceleration control section causes a brake system attached to the vehicle to perform automatic decelerating operation independently of a driver's brake pedal operation, the brake system including a compressed air source, a hydraulic wheel brake for applying braking power to each wheel of the vehicle, and an air-over hydraulic booster for converting pneumatic pressure supplied from the compressed air source through a first line into hydraulic pressure; and said deceleration control section includes a valve, provided in a second line connecting the compressed air source and the air-over hydraulic booster, and a valve control section for controlling the valve.

22. An automatic deceleration control apparatus for automatically decelerating a vehicle in accordance with a turning state of the vehicle, thereby stabilizing turning behavior of the vehicle, comprising:
   a turning state detecting section for detecting the turning state of the vehicle;
   a lateral acceleration detecting section for detecting an actual lateral acceleration generated in the vehicle;
   a friction coefficient detecting section for detecting the friction coefficient of a road surface;

a deceleration control section operable independently of a driver's braking operation and adapted to decelerate the vehicle so as to cause the actual lateral acceleration to be equal to or less than an allowable lateral acceleration when a turning motion of the vehicle is detected by the turning state detecting section; and a setting section for setting an allowable lateral acceleration in accordance with the road friction coefficient detected by the friction coefficient detecting section, the setting section being adapted to set the allowable lateral acceleration at a value which increases with increase in the road friction coefficient when the road friction coefficient falling within a medium or low region is detected by said friction coefficient detecting section and to restrain increase of the allowable lateral acceleration when the road friction coefficient falling within a high region is detected by said friction coefficient detecting section.

23. The automatic deceleration control apparatus according to claim 22, wherein said turning state detecting section includes a vehicle speed sensor for detecting an actual vehicle speed, a lateral acceleration sensor for detecting an actual lateral acceleration, and a steering angle sensor for detecting a front-wheel steering angle, and said friction coefficient detecting section detects the road friction coefficient in accordance with the actual vehicle speed detected by the vehicle speed sensor, the actual lateral acceleration detected by the lateral acceleration sensor, and the front-wheel steering angle detected by the steering angle sensor.

24. The automatic deceleration control apparatus according to claim 22, wherein said setting section sets, as said allowable lateral acceleration, the allowable lateral acceleration computed according to the road friction coefficient detected by the friction coefficient detecting section when the computed allowable lateral acceleration is lower than a preset limit lateral acceleration, and sets the limit lateral acceleration as the allowable lateral acceleration when the computed allowable lateral acceleration is higher than the limit lateral acceleration.

25. The automatic deceleration control apparatus according to claim 22, wherein said setting section includes a lockup table in which the allowable lateral acceleration is set as a function of the road friction coefficient, and determines, from the lookup table, the allowable lateral acceleration corresponding to the road friction coefficient detected by said friction coefficient detecting section.

26. The automatic deceleration control apparatus according to claim 22, wherein said deceleration control section causes a brake system attached to the vehicle to perform automatic decelerating operation independently of a driver's brake pedal operation, the brake system including a compressed air source, a hydraulic wheel brake for applying braking power to each wheel of the vehicle, and an air-over hydraulic booster for converting pneumatic pressure supplied from the compressed air source through a first line into hydraulic pressure; and said deceleration control section includes a valve, provided in a second line connecting the compressed air source and the air-over hydraulic booster, and a valve control section for controlling the valve.

* * * * *

UNITED STATES PATENT AND TRADEMARK OFFICE
CERTIFICATE OF CORRECTION

PATENT NO. : 6,081,761

DATED : June 27, 2000

INVENTOR(S): Masaharu HARADA, Katsushi MATSUDA, and kunio SAKATA

It is certified that error appears in the above-identified patent and that said Letters Patent is hereby corrected as shown below:

On the Cover Page, Line 10, change:

[22] Filed: Jan. 3, 1998 to --[22] Filed: April 3, 1998--

Signed and Sealed this

Twenty-second Day of May, 2001

Attest:

NICHOLAS P. GODICI

*Attesting Officer*        *Acting Director of the United States Patent and Trademark Office*